United States Patent
Chen

(10) Patent No.: US 7,356,712 B2
(45) Date of Patent: Apr. 8, 2008

(54) METHOD OF DYNAMICALLY ASSIGNING NETWORK ACCESS PRIORITIES

(75) Inventor: Chih-Wei Chen, Taipei (TW)

(73) Assignee: Inventec Corporation, Taipei (TW)

( * ) Notice: Subject to any disclaimer, the term of this patent is extended or adjusted under 35 U.S.C. 154(b) by 770 days.

(21) Appl. No.: 10/685,425

(22) Filed: Oct. 16, 2003

(65) Prior Publication Data

US 2005/0086521 A1 Apr. 21, 2005

(51) Int. Cl.
- *H04L 9/00* (2006.01)
- *G06F 7/04* (2006.01)
- *G06F 17/30* (2006.01)
- *G06F 15/16* (2006.01)
- *G06K 9/00* (2006.01)

(52) U.S. Cl. .................. 713/201; 713/150; 726/2; 726/3

(58) Field of Classification Search ........... 713/150; 726/2–3

See application file for complete search history.

(56) References Cited

U.S. PATENT DOCUMENTS

| | | | | |
|---|---|---|---|---|
| 5,315,657 | A * | 5/1994 | Abadi et al. | 726/4 |
| 5,550,970 | A * | 8/1996 | Cline et al. | 715/772 |
| 2002/0087675 | A1* | 7/2002 | Yoshii et al. | 709/223 |
| 2004/0031058 | A1* | 2/2004 | Reisman | 725/112 |
| 2005/0060608 | A1* | 3/2005 | Marchand | 714/18 |

* cited by examiner

*Primary Examiner*—Nasser Moazzami
*Assistant Examiner*—Chinwendu C Okoronkwo
(74) *Attorney, Agent, or Firm*—Birch, Stewart, Kolasch & Birch, LLP

(57) ABSTRACT

A method of dynamically assigning network access privileges is disclosed to define a privilege parameter table according to the access request command. A corresponding weighted parameter is assigned according to the privilege parameter table. Through a sorting mechanism, the weighted sums of all access routines are put into a table, according to which the access procedures are performed.

10 Claims, 4 Drawing Sheets

METHOD OF DYNAMICALLY ASSIGNING NETWORK ACCESS PRIORITIES

BACKGROUND OF THE INVENTION

1. Field of Invention

The invention relates to a method of assigning network access priority and, in particular, to a method that distribute system resources as the number of access routines increases or decreases.

2. Related Art

The storage server is a public space in a network environment. It is widely used in local area networks (LAN's) or the Internet, allowing several clients or user accounts to access data. Although this access mechanism is convenient, there are many situations where the storage server is used for private purposes. Generally speaking, the data stored in the storage server should be public related files. Due to difficulties in management, the storage server is often misused by individuals in sizeable companies or enterprises. For example, mp3 files, games, private pictures or even private digital audio/video (AV) files are often stored in the server. If an employee has to perform an access process in order to complete an assigned job, its access may be delayed because some unknown user in the access control list of the storage server is accessing a large digital AV file at the same time. On the other hand, storing non-business related files in the storage server also wastes the resources of the company.

To address this problem, a priority management method has been proposed in the prior art. The method defines in the database a list of certain people who are allowed to access specific data. Using the concept of weights, some users are assigned with higher priorities for the convenience of management. Not all users online can access any data. Thus, in order to access certain files, the user not only has to be in the file management list but also has to obtain a suitable priority through some kind of mechanism or verification. Although this method is ideal for small companies or teams, it does not disclose in detail the priority assigning mechanism for big companies that have many users accessing data continuously. It does not provide a solution when multiple users are using system resources simultaneously. Therefore, there may be problems such as that system resources cannot be flexibly distributed if a particular user is in an emergency to access data or that a user is disconnected because his or her priority is not high enough.

SUMMARY OF THE INVENTION

The invention provides a method to effectively avoid private uses of the public storage server. For the issue of access control list when simultaneous accesses occur, the invention makes an efficient distribution of the system resources under the premise that no other access routines are interrupted. To solve the foregoing problems, the invention provides a method of dynamically assigning network access priorities. According to the contents of the access request command, the method assigns priority parameters corresponding to the access target, the command sending source, and the command sending time. Finally, the priority parameters are summed up to produce an access priority list. Using the access priority list, the system dynamically distributes system resources after each new access is finished.

Using the invention, the system can have a strategic gauge through the self-defined priority table to effectively prevent those accesses unrelated to business. When simultaneous multiple accesses occur, the invention allows the users to share the network without interrupting any access by brutal force. Therefore, the invention can make the network access usage more reasonable and efficient.

BRIEF DESCRIPTION OF THE DRAWINGS

The invention will become more fully understood from the detailed description given hereinbelow illustration only, and thus are not limitative of the present invention, and wherein.

DETAILED DESCRIPTION OF THE INVENTION

Figure 1:
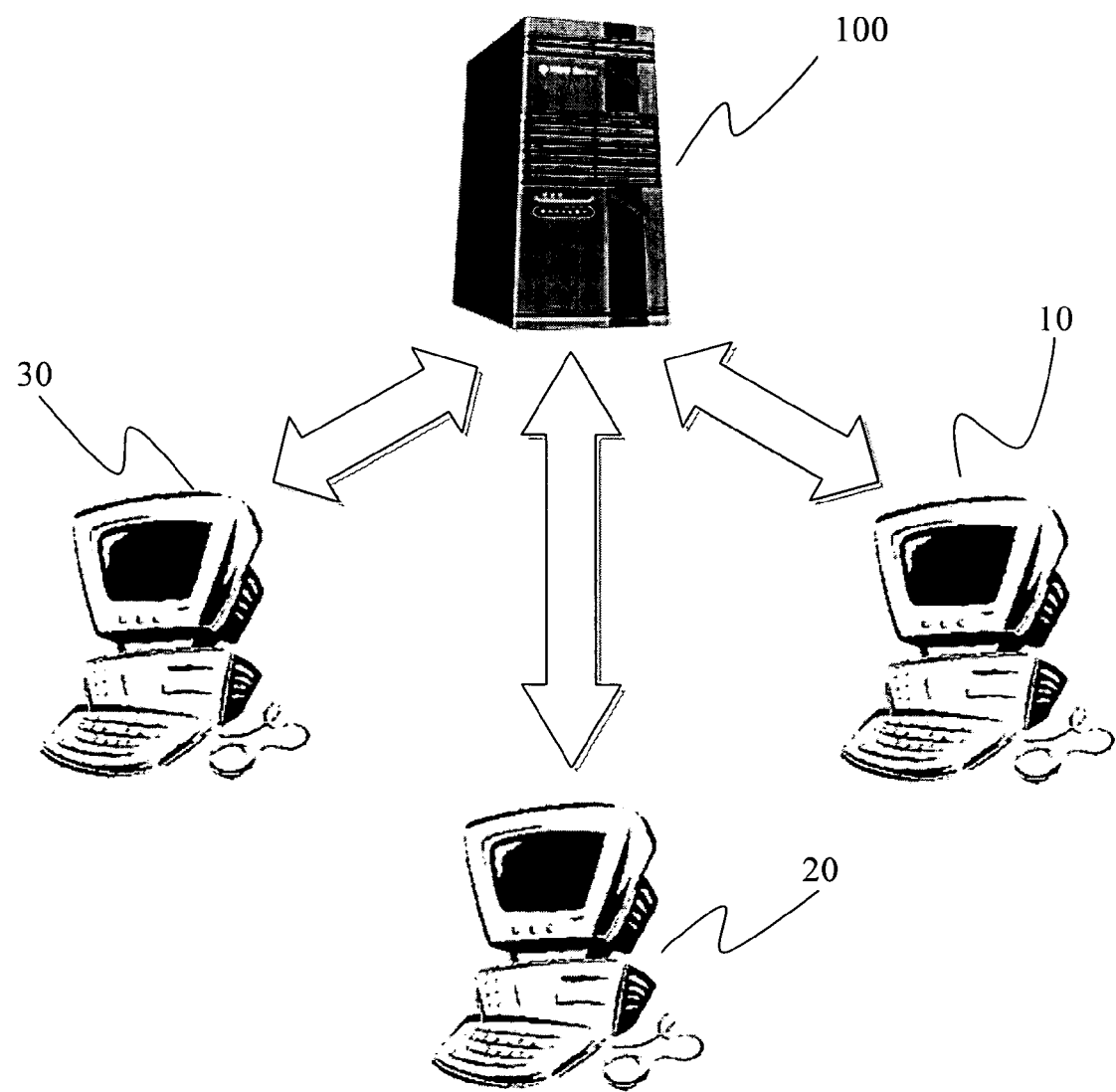
FIG. 1 is a schematic view showing the disclosed network environment.
Figure 2:
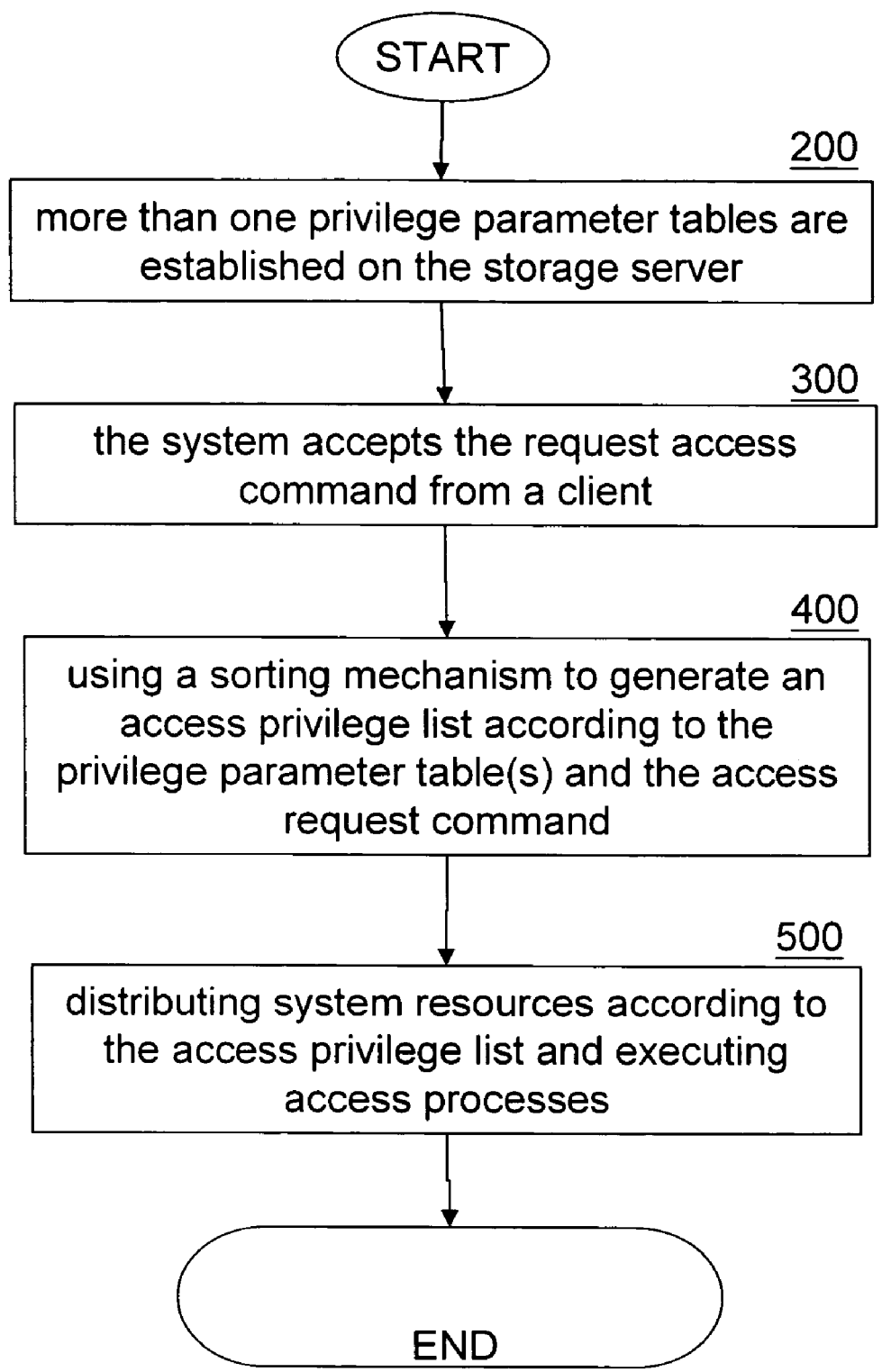
FIG. 2 is a flowchart of the disclosed method of dynamically assigning network access priorities.

Suppose there are several clients 10, 20, 30 sharing data stored in a storage server 100 using the Internet or a local area network (LAN). Each user has a network access account. Each client has its own network address for uploading to and downloading from the storage server 100.

Suppose several user clients 10, 20 already access jobs in the access control list on the storage server 100. When a new client 30 wants to send an access message to the storage server 100, the system follows the disclosed method to dynamically assigning the network access priorities. First, more than one priority parameter tables are established on the storage server (step 200). The spirit of the invention is to define a weighted standard according to the access target, the sending source of the access request command, and the sending time of the access command in order for the access job with the highest weighted priority parameter to have the highest priority. In other word, more system resources are granted for the job. The priority table basically has two fields: one has the defining target, such as the access target, the sending source of the request access command, and the sending time of the access command; and the other has the corresponding weighted parameter, which is defined according to its type.

In step 300, the system accepts the request access command. When each of the users at clients 10, 20, 30 wants to access data, a access request command is first sent from the user. The user has to wait for the reply from the storage server 100. The command includes the information of the storage target, the sending source of the access command, and the sending time of the access command. The storage target further contains such information as the file type, the file size, and the estimated accessing time that are to be used as references for determining the priority. For example, one can assign the .PDF files with the highest weight and the .DOC files are the next. The standard and file types are defined by the enterprise itself so that business-related accesses obtain the highest processing priorities. Moreover, since large-size file transmissions generally affect the network quality and slow down access actions of other users, one can also assign a lower weight to such accesses. This arrangement enables the system to finish quick and easy jobs. As the network quality is kept well during the whole process, delays of urgent and small file transmissions can be avoided.

Besides, the sending source of the access command is also a consideration. Since there are different levels in a company, the importance and values of a job naturally increase with the position of the user in the company. If a user with a higher position in a company cannot obtain a higher priority in the access control list during multiple accesses, then he or she cannot make prompt decisions due to the delay of retrieving important data. Therefore, the invention assigns different weight parameters to users according to their position in the company. The user's network ID is used to identify his or her position in the company. One can also use the IP address of each computer to determine the identity.

Figure 3:
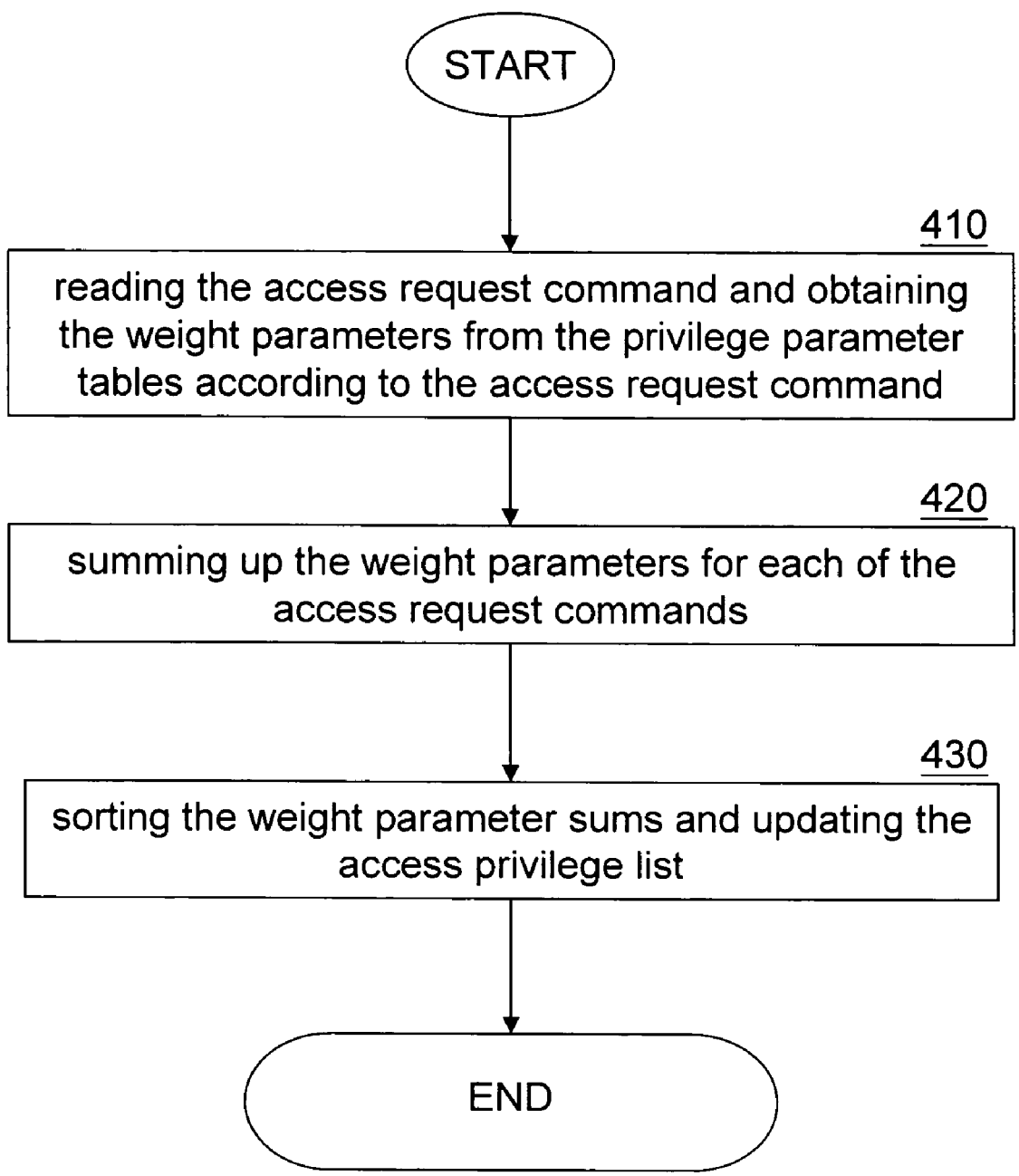
FIG. 3 is a flowchart of the steps in the ranking mechanism.

According to the priority parameter table and the access request command, a ranking mechanism is used to generate an access priority list (step 400). The contents of the access request command have several weight parameters, the sum of which is sorted to generate an access priority list (see FIG. 3). The ranking mechanism includes the following steps. First, the system reads the access request command and obtains the corresponding weight parameter from the priority parameter tables according to the command (step 410). In other words, the access request command is analyzed to obtain a weight parameter for each of the predefined target. The weight parameters are then summed up (step 420). That is, an addition subroutine is employed to add up all the weight parameters belonging to the access command, obtaining a priority value. The weight parameter sum is used to update the access priority list (step 430). The access priority list has at least three fields. One is the weight value, the sum of all the weight parameters. Another is the access process name, which is also the ID of the access command. The other is the system resource percentage. Whenever a new access process is added into the access priority list or an existing access process finishes, all the above-mentioned three fields are updated at the same time. This is the feature of the dynamical assignment disclosed by the invention.

In step 500, the system distributes the system resources according to the access priority list and executes access processes. The access priority list indicates the weight value of each access process. The system distributes the system resources according to the weight values. The distribution method disclosed by the invention is dynamical. The weight values of all the access processes are added up to a total weight value. The weight value of each access process is divided by the total weight value to obtain a dynamical distribution percentage. The system then uses the dynamical distribution percentage as the reference for the CPU to schedule access processes. This method is particular useful for processing simultaneous multiple accesses. The finite bandwidth of the network can be thus optimized for public uses in a flexible way. On the other hand, for those processes unrelated to the business, such as downloading MP3 or AV files, the system slows down their efficiencies to discourage such processes. Moreover, users with existing processes are not interrupted by new users because of the new users have higher priorities.

Figure 4:
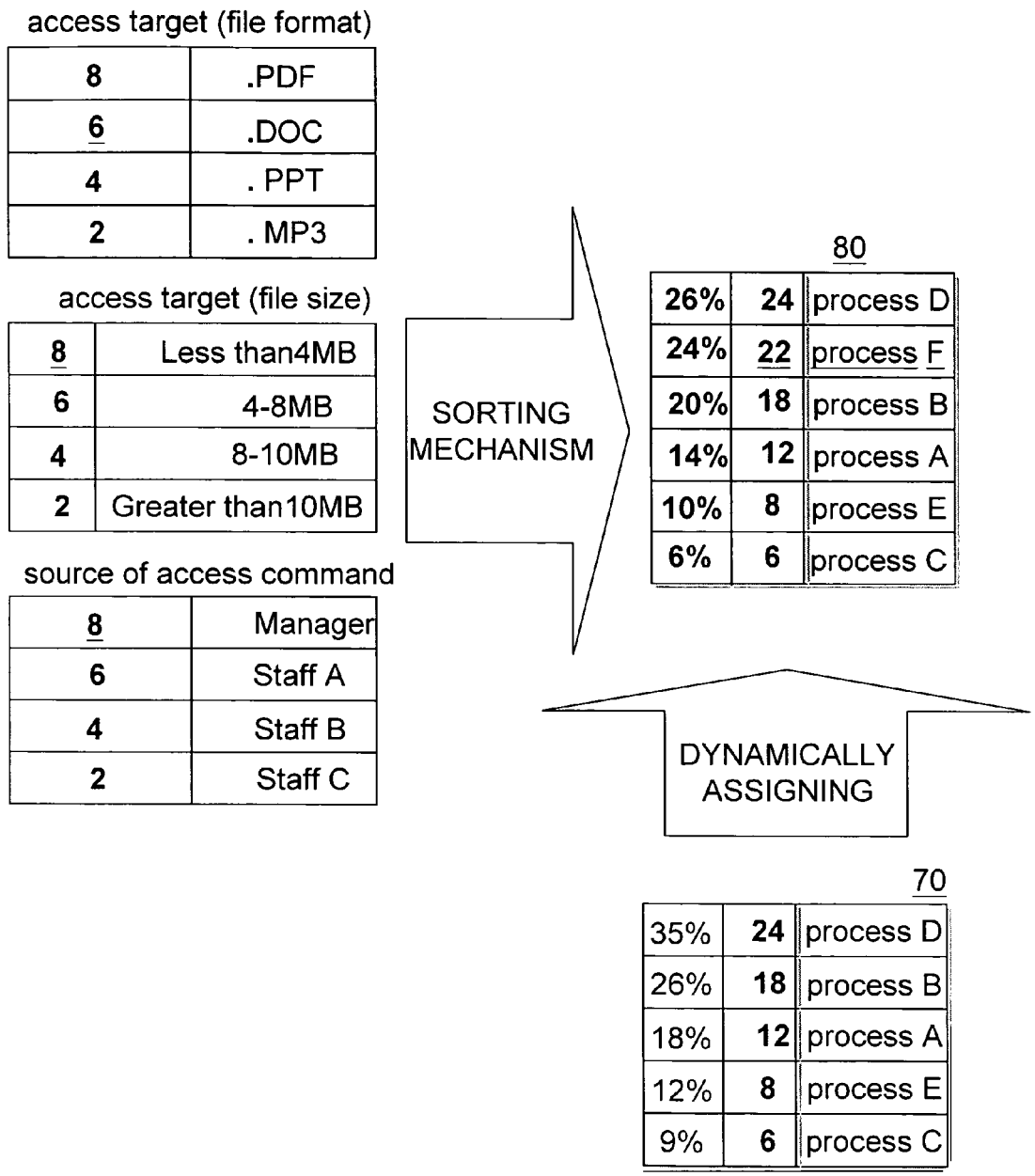
FIG. 4 is an embodiment of the invention.

In the following, we use an embodiment to describe the procedure flow of the invention. With reference to FIG. 4, suppose an access request command is sent out. The access target is a text file (.DOC format), the sending source of the access command is a manager, and the file size is smaller than 4 MB. After the sorting process, the priority value is determined to be 22, corresponding to the process F as shown in the access priority list 80. Before executing the command, there are already processes A, B, C, D and E in the control list. The invention dynamically assigns a new set of priority values to all the existing processes, updating from the original access priority list 70 to the new access priority list 80.

Certain variations would be apparent to those skilled in the art, which variations are considered within the spirit and scope of the claimed invention.

The invention claimed is:

1. A method of dynamically assigning network access priority by analyzing an access request command from a client to reallocate an access priority, the method comprising steps of:
    establishing at least one priority parameter table on a storage server, the priority parameter table including an access target, a sending source and corresponding weight parameters for each of the access target and the sending source;
    receiving the access request command from the client, the access request command including an access target of the access request command and a sending source of the access request command;
    analyzing the access request command according to the weight parameters of the priority parameter table by comparing the access target of the access request command with the corresponding access target of the priority parameter table and comparing the sending source of the access request command with the corresponding sending source of the priority parameter table respectively to generate an access priority value;
    performing a ranking mechanism according to the access priority value to reallocating an access priority list; and
    executing the access priority list in sequence.

2. The method of claim 1, wherein the access target comprises a file type and a file size.

3. The method of claim 1, wherein the access target further comprises an estimated files access time.

4. The method of claim 1, wherein the sending source of the access request command is consisting of a group of a user ID, a client machine IP address and the combination thereof.

5. The method of claim 1, wherein the step of generating the access priority value further comprises analyzing a sending time of the access request command according to the priority parameter table.

6. The method of claim 5, wherein the ranking mechanism includes the steps of:
    reading the access request command and obtaining the weight parameters from the priority parameter tables according to the access request command;
    summing up the weight parameters for each of the access request command to generate a sum of the weight parameters; and
    sorting the sum of the weight parameters and updating the access priority list.

7. The method of claim 1, wherein the ranking mechanism includes the steps of:
    reading the access request command and obtaining the weight parameters from the priority parameter tables according to the access request command;
    summing up the weight parameters for each of the access request command to generate a sum of the weight parameters; and
    sorting the sum of the weight parameters and updating the access priority list.

8. The method of claim 1, wherein the access priority list is reallocated by using dynamical distribution proportion:

$$(a_1+a_2+a_3+ \ldots +a_n)/(a_1+a_2+ \ldots +a_n+b_1+b_2+ \ldots +b_n+ \ldots +m_1+m_2+ \ldots m_n);$$

where a, b, ..., and m represent distinct access processes and 1, 2, ..., and n represent different types of weight parameters.

9. The method of claim 6, wherein the access priority list includes names of access process, the sum of the weight parameters, and system resource distribution percentages.

10. The method of claim 7, wherein the access priority list includes names of access process, the sum of the weight parameters, and system resource distribution percentages.

\* \* \* \* \*